United States Patent [19]

Carter et al.

[11] 3,729,408

[45] Apr. 24, 1973

[54] CATALYTIC REFORMING PROCESS
[75] Inventors: James L. Carter, Chatham; John H. Sinfelt, Berkeley Heights, both of N.J.
[73] Assignee: Esso Research and Engineering Company, Linden, N.J.
[22] Filed: Dec. 28, 1970
[21] Appl. No.: 102,208

[52] U.S. Cl. ............208/65, 208/138, 252/474, 252/466 PT
[51] Int. Cl. ......C10g 35/08, B01j 11/08, B01j 11/22
[58] Field of Search............................208/138, 65; 252/474, 466 PT

[56] References Cited

UNITED STATES PATENTS

| | | | |
|---|---|---|---|
| 2,911,357 | 11/1959 | Myers et al. | 208/138 |
| 3,576,736 | 4/1971 | Kittrell | 252/474 |
| 3,198,728 | 8/1965 | Evans | 208/138 |
| 3,442,973 | 5/1969 | Sinfelt et al. | 252/474 |
| 3,567,625 | 3/1971 | Sinfelt et al. | 208/138 |

Primary Examiner—Daniel E. Wyman
Assistant Examiner—Werten F. W. Bellamy
Attorney—Chasan & Sinnock and John P. Corcoran

[57] ABSTRACT

A catalytic reforming process wherein naphtha feed streams, boiling from about 80° to 450° F, and comprising naphthenes, paraffins and aromatics, are contacted, in an initial reaction zone, with a hydrogen containing gas, in the presence of a catalyst comprising Pt and a group IB metal supported on a refractory oxide; passed into a tail zone wherein the feed stream is again contacted with a catalyst and thereby further reacted; and a high octane product is recovered. In a preferred embodiment the Group IB metal is Cu.

14 Claims, No Drawings

CATALYTIC REFORMING PROCESS

BACKGROUND OF THE INVENTION

1. Field of the Invention

This invention relates to a catalytic reforming process. More particularly this invention relates to reforming naphtha feed streams boiling from about 80° to 450° F and comprising naphthenes, paraffins and aromatics in a combination process wherein the feed stream is contacted in an initial reaction zone with a hydrogen containing gas in the presence of a catalyst comprising Pt and a metal selected from Group IB of the Periodic Table of the Elements, supported on a refractory oxide, then passed into a tail zone wherein the feed stream is again contacted with a catalyst and thereby further reacted, and a high octane product is recovered. Preferably the Group IB metal is Cu.

2. Description of the Prior Art

Catalytic reforming is now a matter of record and commercial practice in this country. Basically, reforming involves the contacting of a naphtha fraction, either virgin, cracked, Fisher-Tropsch or any mixtures thereof, with a solid catalytic material. The catalyst is ordinarily a supported noble metal catalyst, such as platinum or alumina. Contacting takes place at elevated temperatures and pressures in the presence of added or recycled hydrogen. Hydrogen is essential since it suppresses the deactivation of the catalyst. The process itself produces substantial amounts of hydrogen, and in actuality this is the source of the hydrogen which is recycled to repress the deactivation of the catalyst; the deactivation of the catalyst is caused at least in part by carbon formation.

Reactions involved in catalytic reforming are: (1) dehydrogenation of naphthenes to the corresponding aromatic hydrocarbons such as cyclohexane dehydrogenation to benzene; (2) isomerization of normal paraffins to branched-chain paraffins or isomerization of ring compounds, such as ethylcyclopentane to methylcyclohexane, which latter compound readily dehydrogenates to form toluene; (3) dehydrocyclization of paraffins to aromatics, e.g., n-heptane to toluene; and (4) hydrocracking of the higher boiling constituents.

Fixed bed catalytic reforming processes may be divided into three general classes: non-regenerative, semi-regenerative and cyclic. The three processes differ most significantly in that the cyclic has an alternate or swing reactor which is so manifolded that it may replace any reactor within the system in order that the replaced reactor may be regenerated. The instant invention is intended to include all classes of reforming.

A great variety of catalysts for catalytically reforming a naphtha feed stream is known; perhaps the best known of these catalysts is platinum dispersed upon a highly purified alumina support such as one may obtain from aluminum alcoholate. Such a catalyst is described in detail in U.S. Pat. No. 2,636,865, the disclosure of which is herein incorporated by reference. Other members of the platinum group such as palladium or rhodium may be utilized, but platinum is much preferred. The alumina support should have a high surface area, greater than 50 m²/gm. It should also have acidic properties, and hence must be substantially free of alkaline impurities.

The reforming system can be considered to consist of two separate reaction zones. In the initial zone, naphthene dehydrogenation and isomerization are the primary reactions. In the tail zone, dehydrocyclization and hydrocracking reactions occur predominantly.

It is noted that commercial reforming systems can be composed of three to four reactor units in series. These units will together comprise both the initial reaction zone and the tail zone. It is to be understood that in the process of this invention the first 1, 2 or 3 reactors can comprise the initial reaction zone and the remaining reactor or reactors can comprise the tail zone. It has been generally thought that the Pt-alumina catalyst is the best available for the reactions occurring in the initial zone, and attempts to improve the efficiency of naphtha reforming processes have centered on finding catalysts with improved efficiency for the reactions occurring in the tail zone. In actual practice with platinum-alumina catalyst, a substantial fraction of the alkylcyclopentanes which are present in the naphtha feed, undergoes hydrogenolysis or hydrocracking reactions in the initial reaction zone, thus limiting the selectivity of conversion of the alkylcyclopentanes to the desired high octane number aromatic products.

SUMMARY OF THE INVENTION

It has now been unexpectedly found that the substitution of a Pt-Group IB bimetallic catalyst for the Pt catalysts known in the art, in the initial reaction zone of a reforming process, greatly increases the selectivity of conversion of alkylcyclopentanes to high octane number aromatic products.

The catalyst of this invention comprises Pt and a Group IB metal on a refractory oxide support. The Group IB metal is preferably Cu and the support is preferably selected from the group consisting of alumina, silica-alumina, crystalline aluminosilicates, and halogen containing alumina. The support is usually acidic and has a high surface area, e.g., 50 to 300 m²/g. The support may also contain small amounts of halogen, i.e., Cl and F, for added acidity. This halogen may be added to the support in the catalyst preparation, or it can be added to the catalyst in situ in the reactor.

The Pt metal comprises about 0.05 to 2.0 wt. percent of the total catalyst, preferably 0.1 to 0.6 wt. percent and most preferably 0.25 to 0.35 wt. percent. The Group IB metal will comprise 0.05 to 2.0 wt. percent of the total catalyst. In the case of copper, the amount would be preferably 0.1 to 0.6 wt. percent and most preferably 0.25 to 0.35 wt. percent. The remaining catalyst weight is supplied by the support and/or halogen. Halogen may vary from 0.1 to 2.0 wt. percent, preferably from 0.3 to 1.0 wt. percent of the total catalyst.

The catalyst may be prepared by impregnating the support with soluble platinum and Group IB metal salts. A preferred method for preparing the catalyst is to impregnate the support with an aqueous solution of chloroplatinic acid and a salt such as copper nitrate.

While not wishing to be limited by theory, it is believed that the hydrogenolysis (cracking) activity of the catalyst is inhibited by incorporation of the Group IB metal.

The feed streams which can be successfully treated by the process of this invention include naphthas. A naphtha feed stream is a petroleum fraction boiling between about 80° and 450° F., preferably between 120° and 40° F., and contains paraffinic, naphthenic and aromatic hydrocarbons. In general the naphtha feed stream will contain about 15 to 75 percent by weight paraffins, about 15 to 75 percent by weight naphthenes and about 2 to 20 percent aromatics.

In the process of this invention, the naphtha feed stream will contain 0 to 15 wt. percent naphthenes upon leaving the initial reaction zone, preferably 0 to 5 wt. percent, the remainder consisting of aromatics and paraffins. With the description of the novel process of this invention, it will be possible for the skilled artisan to design a reforming system to give the maximum yield of high research octane number product from any suitable feed stream.

Reaction conditions within both the initial reaction zone and the tail zone may vary widely. Pressure for instance, may vary between 0 and 900 psig, preferably between 15 and 600 psig, and most preferably between 50 and 500 psig. Temperature may vary between 600° and 1050°F., preferably between 750 and 1,000° F., and most preferably between 780° and 980° F. The temperature and the pressure chosen will of course be a function of the particular feed stream utilized.

Hydrogen is circulated or recycled through the initial reaction zone and the tail zone at a rate of 0 to 15,000 standard cubic feet (SCF) per barrel (Bbl), preferably 1,000 to 10,000 standard cubic feet per barrel and most preferably 2,000 to 6,000 standard cubic feet per barrel of liquid naphtha feed.

The space velocity, which is expressed as weight in pounds of feed charged per hour per pound of catalyst, depends upon the activity level of the catalyst, the character of the feed stock and the desired octane number of the product. Ordinarily it may vary from about 0.2 W/Hr./W to 20 W/Hr./W, preferably from about 0.5 W/Hr./W to about 10 W/Hr./W and most preferably from about 1 to 5 W/Hr./W based on the total catalyst in the system.

It is preferred to use the catalyst in the form of pellets or extrudates which are preferably one-sixteenth to one-fourth inch in diameter.

In a preferred embodiment of the instant invention a train of four catalytic reforming reactors is utilized. The third and fourth reactors, i.e., the tail zone, contain a catalyst comprising platinum on an alumina support. The catalyst comprises about 0.1 to 1.0 wt. percent of platinum and the remainder alumina and halogen, the latter ranging from 0 to 2.0 wt. percent. The catalyst is prepared by impregnation of the alumina with an aqueous solution of chloroplatinic acid. It is then dried at about 220°-250° F. and subsequently calcined in air at 400°-1,100° F. The finished catalyst is formed into pellets of about 1⅛-inch size and charged to the reforming reactors. In the first two reactors, i.e., the initial reaction zone, there is the catalyst of the instant invention, which comprises about 0.3 wt. percent platinum and 0.3 percent Cu on alumina. The finished catalyst is used in the form of ⅛-inch cylindrical pellets or extrudates of similar size. The amount of catalyst charged to the first two reactors is about 25 to 75 wt. percent of the total catalyst employed in all the reactors. Feed stream is a naphtha cut boiling between about 120° and 400° F. which comprises about 15 to 75 wt. percent paraffins, about 15 to 75 wt. percent naphthenes, and about 2 to 20 wt. percent aromatics; weight hourly space velocity of naphtha feed is 0.5 to 10 pounds of feed per hour per pound of total catalyst in the system. Reactor temperatures and pressures are in the range of 700° to 1,000° F. and 100 to 500 psig, respectively. The hydrogen recycle gas rate is 1,000 to 10,000 standard cubic feet per barrel of naphtha feed. The product issuing from the first two reactors contains about 2 to 15 wt. percent naphthenes, the remainder comprising paraffins, both normal and iso, and aromatics. After passage through the third and fourth reactors containing the platinum catalyst, the product is separated into two fractions, one containing $C_5$ and higher molecular weigh hydrocarbons and the other $C_4$ and lower molecular weight hydrocarbons. The $C_5$+ fraction contains 60 to 80 wt. percent aromatics, or higher, with research clear octane numbers in the range of 90 to 105, or higher.

SPECIFIC EMBODIMENTS

Example 1 — Conversion of Naphthenes to Aromatics

This example demonstrates the superior ability of the catalyst of the instant invention to convert alkylcyclopentanes to aromatics. A model compound, methylcyclopentane, was converted to benzene using a Pt-Cu bimetallic catalyst* and the standard Pt catalyst. This experiment demonstrates an important reaction occurring in the initial reaction zone of a catalytic reforming process.

Reaction Conditions

Temperature — 850° F.
Pressure — 200 psig
$H_2$/Methylcyclopentane mol ratio = 5
Conversion 30 to 40 percent
Feed — Methylcyclopentane

| Run | Catalyst Composition | Selectivity to Benzene |
|---|---|---|
| A | 0.3 wt. % Pt on Alumina | 27.0% |
| B | 0.3 wt. % Pt on Alumina 0.1 wt. & Cu | 42.0% |
| C | 0.3 wt. % Pt on Alumina 0.3 wt. % Cu | 55.0% |
| D | 0.3 wt. % Pt 0.6 wt. % Cu | 18.0% |

* A typical example of the catalyst preparation is illustrated thus:

PREPARATION OF THE CATALYST UTILIZED IN RUN C

The proper amounts of chloroplatinic acid and cupric nitrate to yield 0.06 gm of Pt and 0.06 gm of Cu were dissolved in water, and the total aqueous solution volume was brought to 13 cc.

Twenty gms of eta $Al_2O_3$ were contacted with the solution and the mixture was dried overnight at 220°F. prior to charging to the reactor.

Note that optimum results are obtained with equal weights of Cu and Pt in the catalyst. Under these conditions the selectivity is twice that of the standard catalyst described in Run A.

When Ag or Au is substituted for Cu in Runs B or C, similar results are obtained in that the selectivity of conversion of methylcyclopentane to benzene is greater than that with the standard catalyst described in Run A.

Example 2 — Reforming of a Naphtha Feed Stream

In this experiment a naphtha feed stream, having the following characteristics:

| | |
|---|---|
| Boiling range | 190°F. — 315°F. |
| Octane number | 55.7 RON |
| % Paraffins | 46.4 |
| % Naphthenes | 32.7 |
| % Aromatics | 16.7 | was reformed under the following conditions:

| | |
|---|---|
| Temperature | 940°F. |
| Pressure | 200 psig |
| Space velocity | 6 W/Hr./W |
| $H_2$ flow | 4400 SCF/Bbl. |
| Catalyst | 0.3% Pt on $Al_2O_3$ |
| | 0.3% Cu |

The reaction product had a research octane number of 84.5. This material is then processed over a conventional platinum-alumina catalyst in the tail zone at 300 psig, at temperatures of 900°–950° F. to yield a product with a research octane number of 98 or higher.

What is claimed is:

1. A combination reforming process, wherein a hydrocarbon feed stream is contacted in an initial reaction zone with a catalyst in the presence of hydrogen, said catalyst consisting essentially of platinum and a metal selected from Group IB of the Periodic Table of the elements, supported on a refractory oxide, and subsequently led into a tail zone, wherein the hydrocarbon feed stream is contacted with a catalyst, comprising platinum or alumina, and thereby further reacted.

2. The process of claim 1, wherein the hydrocarbon feed stream is a naphtha stock boiling in the range of 80° to 450° F. and comprising paraffins, naphthenes, and aromatics.

3. The process of claim 2, wherein the said naphthenes are substantially converted to aromatics in the initial reaction zone.

4. The process of claim 3, wherein the refractory oxide support is selected from the group consisting of alumina, silica-alumina, acid treated alumina, and crystalline alumino-silicates.

5. The process of claim 4, wherein the Group IB metal is Cu.

6. The process of claim 5, wherein the catalyst consisting essentially of from about 0.05 to about 2.0 percent Pt and from about 0.05 to about 2.0 percent Cu and the remainder support.

7. The process of claim 5, wherein the pressure in the initial reaction zone ranges from about 50 to 500 psi and the temperature ranges from about 750° to about 1,000° F.

8. The process of claim 7, wherein reforming takes place in the presence of a hydrogen recycle of from 1,000 to 10,000 standard cubic feet per barrel of naphtha feed.

9. A process for catalytically reforming a hydrocarbon feed stream boiling between 80° and 450° F. and containing 15 to 75 percent naphthenes, 15 to 75 percent paraffins and the remainder aromatics, which comprises passing said feed stream and a hydrogen-rich gas at a temperature of from 600° to 1,050° F., a pressure of 15 to 600 psig, at a space velocity of 0.5 to 10 W/Hr./W, into a first catalytic reforming zone, said zone containing a supported catalyst consisting essentially of Pt and a metal selected from Group IB of the Periodic Table of the elements, whereby said naphthene content is decreased to a maximum level of about 15 wt. percent, passing the effluent from said first zone into a second catalytic reforming zone, said second zone comprising a Pt on alumina catalyst, and recovering a product of high octane number.

10. The process of claim 9, wherein said Group IB metal is Cu.

11. The process of claim 9 wherein said catalyst of the first catalytic reforming zone consisting essentially of from about 0.05 to 2.0 percent Pt, from about 0.05 to about 2.0 wt. percent Cu, and the remainder support.

12. A process for the conversion of naphthenes to aromatics which comprises contacting a naphtha feed stream, said naphtha feed stream comprising from 15 to 75 percent by weight naphthenes with a catalyst consisting essentially of platinum and a metal selected from Group IB of the Periodic Table of the elements, supported on a refractory oxide support, said platinum comprising from about 0.05 to 2.0 weight percent and said Group IB metal comprising from about 0.05 to 2.0 weight percent of the total catalyst, in the presence of hydrogen, at a temperature of from 600° to 1,050° F. and a pressure of from 15 to 600 psig, whereby said naphthenes are substantially converted to aromatics.

13. The process of claim 12 wherein said Group IB metal is copper.

14. The process of claim 13 wherein said naphtha feed stream has a boiling point range of from 80° to 450° F.

* * * * *